2,904,146
TRACTOR CONTROLS

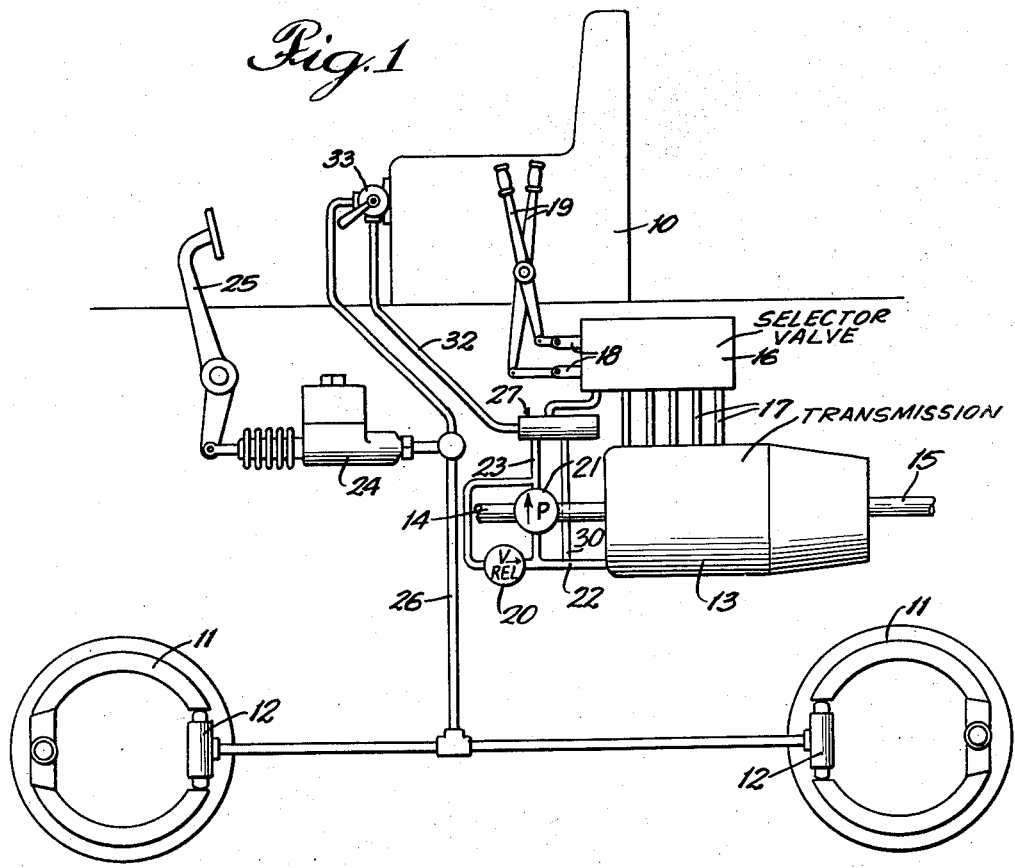
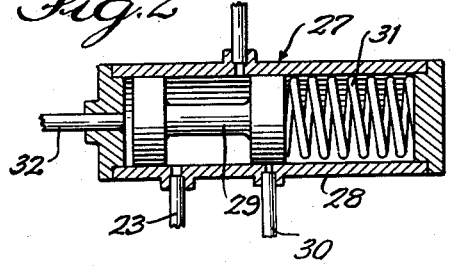

James B. Codlin, Deerfield, Ill., assignor, by mesne assignments, to Allis-Chalmers Manufacturing Company, West Allis, Wis., a corporation of Delaware Application September 30, 1957, Serial No. 687,082

1 Claim. (Cl. 192—4)

This invention relates to tractor controls, and more particularly to the transmission and brake controls of a tractor vehicle equipped with a material handling unit such as a shovel.

In the operation of tractors, whether of the wheeled or track type, it has been the common practice when picking up or discharging a load to apply the brakes and elevate and tilt the shovel or other load receiving means. It has heretofore been proposed to provide control means which will automatically shift the tractor transmission into neutral whenever the brakes are applied, so that full engine power is available to move the load receiving means and to re-engage the transmission in the selected driving ratio when the brakes are released.

In such controls there is always some lag between release of the brakes and re-engagement of the transmission clutch or the like. Therefore, if the tractor is being loaded or unloaded on a slope, there is a brief interval during which the brakes are released and the transmission is in neutral, so that the tractor may roll freely. In many working locations this may create a serious hazard, as for example, when the tractor is working close to a drop-off.

It is, therefore, an object of the present invention to provide a tractor control in which automatic control of the tractor transmission to shift into neutral when the brakes are applied may be made selectively operable or inoperable easily and quickly at the will of the operator.

According to a feature of the invention, the transmission and brakes are both hydraulically controlled, and a pressure responsive shut off valve is provided in the transmission control connection responsive to pressure in the hydraulic brake system to shift the transmission to neutral when the brakes are applied, and an additional selector valve is provided between the shut off valve and the hydraulic brake system to prevent or permit operation of the shut off valve when the brakes are applied.

The above and other objects and features of the invention will be more readily apparent from the following description, when read in connection with the accompanying drawing in which:

Figure 1 is a diagrammatic view of a tractor control system embodying the invention; and Figure 2 is an enlarged section of the shut off valve.

As illustrated diagrammatically in Figure 1, the control system of the present invention may be applied to a conventional tractor having an operator's seat at 10 and having wheels equipped with brakes 11 applied hydraulically by cylinders 12. The tractor is driven through a transmission 13 having an input shaft 14 connected to an engine on the tractor and an output shaft 15 connected to the tractor driving wheels. The transmission may be of any desired conventional type shiftable into a plurality of forward and reverse ratios and into neutral.

As shown, the transmission is shifted hydraulically under the control of a conventional selector valve 16 having a plurality of conduits 17 extending into the transmission selectively to operate different clutches and brakes to obtain the different driving ratios or neutral. The selector valve 16 may contain a pair of plungers 18 operated through handles 19 conveniently mounted adjacent to the operator's seat so that the operator may easily select forward or reverse ratios. Operating fluid for the transmission controls is provided by a pump 21 driven by the input shaft 14. The pump has an inlet connection 22 to a sump in the transmission and a connection 23 to the selector valve 16 to provide operating fluid for the transmission brakes and clutches. A by-pass is provided around the pump with a pressure relief valve 20.

Liquid for operating the brakes through the cylinders 12 is supplied from a conventional master cylinder 24 operated by a pedal 25 either directly or with power assistance as desired. When the pedal is depressed, liquid under pressure will be forced through the brake lines 26 into the brake cylinders 12 to apply the brakes.

In order to shift the transmission into neutral when the brakes are applied, a shut off valve indicated generally at 27 is provided in the connection 23 to the selector valve 16 to shut off the supply of operating liquid to the selector valve. When this is done, the several brakes and clutches in the transmission will be released and the transmission will be shifted into neutral.

As shown in Figure 2, the selector valve 27 comprises a cylindrical casing 28 in which a valve spool 29 is slidable. The spool 29 is urged to the left to the position shown by a spring 31 and in this position establishes communication between the opposite sections of the connection 23 so that liquid from the pump 21 may flow freely into the selector valve 16. For shifting the spool to the right to cut off the supply of liquid, the left end of the housing 28, as seen in Figures 1 and 2, is connected to the master cylinder 24 through a conduit 32. Thus, when the brakes are applied, hydraulic pressure will be exerted on the left end of the spool 29 to shift it to the right against the spring 31 to cut off the connection 23 so that the transmission will be shifted into neutral. In this position, the spool connects the upper section of the connection 23 and the valve 16 to a vent conduit 30 leading to the inlet side of pump 21 to relieve all operating pressure on valve 16 and on the transmission so that it will shift to neutral.

To prevent operation of the shut off valve 27 when desired, a selector valve 33 is provided in the conduit 32 and is preferably mounted adjacent the operator's seat 10, so that it can conveniently be moved by the operator. When the valve 33 is open, fluid will flow through the conduit 32 each time the brakes are applied to operate the shut off valve 27 and shift the transmission into neutral. When it is desired to maintain the transmission in an operating ratio, as when the tractor is being operated in a dangerous situation, the operator may close the valve 33 thereby cutting off the supply of brake fluid to the shut off valve 27, so that the shut off valve will remain open under all conditions. In this way the operator maintains complete control of the tractor and can operate it in such a manner as to obtain the most efficient and safest operation under all circumstances.

While one embodiment of the invention has been shown and described in detail, it will be understood that this is illustrative only and is not to be taken as a definition of the scope of the invention, reference being had for this purpose to the appended claim.

What is claimed is:

A tractor control comprising, in combination, a tractor vehicle having brakes, hydraulic means to supply fluid pressure to the brakes to engage them, a transmission shiftable to neutral and to different driving ratios, hydraulic means including a supply connection and a selector valve to control the transmission, the transmission being in neutral when there is no fluid supplied thereto through the supply connection and selector valve, a pressure operated shut off valve in the supply connection, a connection from the first named hydraulic means to the shut off valve to close the shut off valve when the brakes are applied, and a selector valve in the last named connection to make the shut off valve effective or ineffective.

References Cited in the file of this patent

UNITED STATES PATENTS

| | | |
|---|---|---|
| 1,786,319 | Starrett | Dec. 23, 1930 |
| 2,085,257 | Getaz | June 29, 1937 |